Oct. 25, 1955  M. PINDZOLA ET AL  2,721,476
MEANS FOR ELIMINATING SHOCK REFLECTION
IN CONFINED SUPERSONIC FLOW
Filed Feb. 15, 1952

INVENTORS
MICHAEL PINDZOLA
RUSSELL W. GAMAGE
BY Leonard F. Wehrlind
ATTORNEY

Oct. 25, 1955

M. PINDZOLA ET AL 2,721,476

MEANS FOR ELIMINATING SHOCK REFLECTION
IN CONFINED SUPERSONIC FLOW

Filed Feb. 15, 1952

P STATIC = P FREE STREAM − P CHAMBER

INVENTORS
MICHAEL PINDZOLA
RUSSELL W. GAMAGE

BY *Leonard F. Wehlind*

ATTORNEY

United States Patent Office 2,721,476
Patented Oct. 25, 1955

2,721,476

MEANS FOR ELIMINATING SHOCK REFLECTION IN CONFINED SUPERSONIC FLOW

Michael Pindzola, Affton, and Russell W. Gamage, St. Louis, Mo., assignors to United Aircraft Corporation, East Hartford, Conn., a corporation of Delaware Application February 15, 1952, Serial No. 271,771

3 Claims. (Cl. 73—147)

This invention relates to flow control devices and more particularly to control devices for eliminating shock reflection from a wall over which a supersonic stream flows.

In running tests on bodies located in a confined supersonic stream such as a wind tunnel or the like, a shock will emanate from the leading edge of the body. This shock may in turn be reflected by the wall of the confining duct so that it impinges back against the body at some point downstream of its leading edge. Such shock reflection prevents the obtaining of proper or correct test data.

Therefore, it is an object of this invention to provide a flow control device for eliminating the reflection of shock waves from the wall of a duct which confines a supersonic stream. Particularly this invention has as its purpose the elimination of such shock reflection over a range of supersonic Mach numbers and/or shock strengths.

These and other objects will become readily apparent from the following description of the drawings in which.

Figure 1:
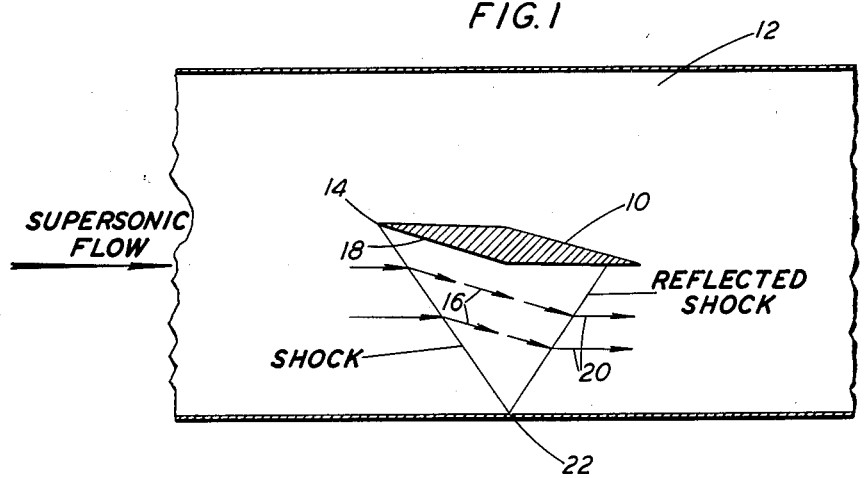
Fig. 1 is a partial, cross-sectional and schematic illustration indicating shock reflection in a duct having solid walls.

As illustrated in Fig. 1, it can be shown that when a body, for example an airfoil 10, is located in a supersonic stream in a confining duct 12 a shock wave will emanate from the leading edge 14 of the airfoil. In passing through the shock the airstream will be turned in the direction of the arrows 16 which are parallel to the surface 18 of the airfoil 10. With the airstream diverted in a direction as illustrated by the arrows 16, it must again be turned parallel to the axis of the main stream as illustrated by the arrows 20. In turning back in the direction of the arrows 20 another shock occurs in the airstream which appears as a reflected shock which leaves the wall 22 of the duct 12 at an angle nearly equal to that at which the primary shock approached the wall 22.

Figure 2:
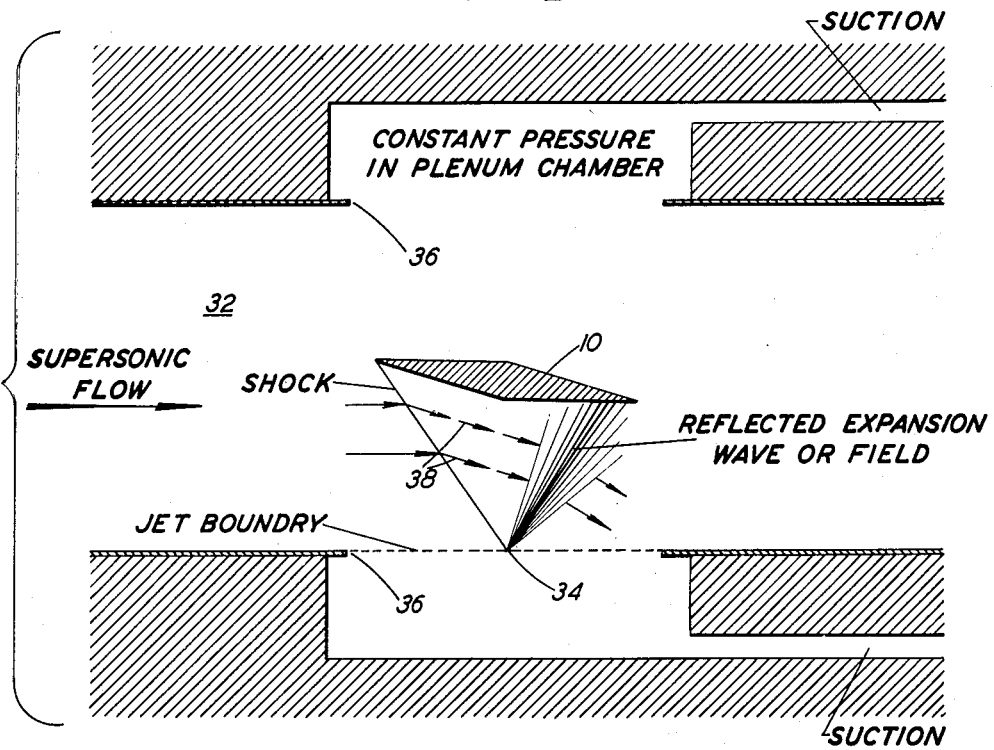
Fig. 2 is an illustration similar to Fig. 1 indicating the effect on supersonic flow where the duct wall is partially open or slotted.

As illustrated in Fig. 2, it is known that in a duct 32 having a wall 34 and a free jet opening 36 therein, an expansion field rather than a shock will be reflected back into the duct downstream of the point where the shock wave impinges against the free jet boundary 34. This results from the fact that the airstream has a larger pressure behind the shock such that a portion of the stream will be diverted outside the free jet boundary. Thus, for example, where the mainstream has been turned in the direction of the arrows 38 the constant pressure boundary requirement will induce a further turning of the flow through the opening 36 so as to generate a reflected expansion field rather than a reflected shock.

The foregoing may be stated in somewhat different language. Referring to Fig. 2, the airstream just ahead of the shock will have a pressure which we can call P. The pressure in the plenum chamber is maintained constant and may be also termed P. Since the pressure, for example P', behind the shock is greater than P, the condition of greater pressure at the jet boundary cannot exist since the pressure in the plenum chamber is held constant at a value P. Therefore, at a point behind the shock the pressure has to again be lowered to the smaller value P. To achieve this condition the shock wave necessarily reflects as an expansion wave which results in reduced pressure.

Figure 3:
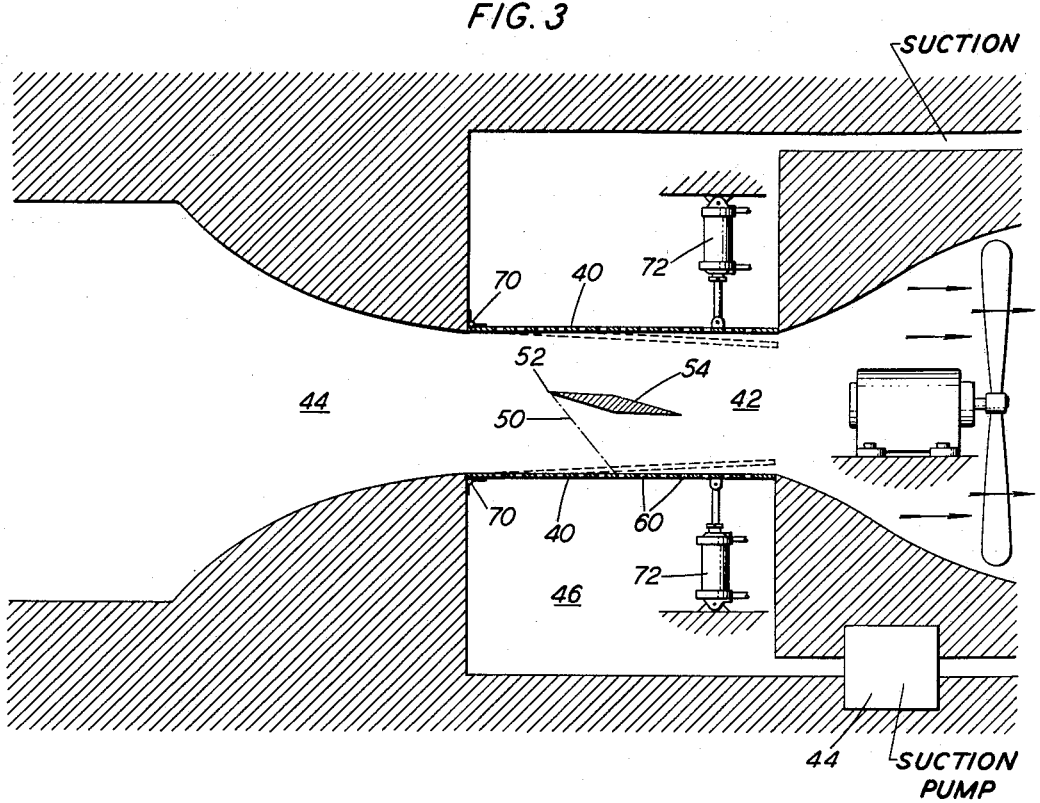
Fig. 3 is a partial cross-sectional view showing a wind tunnel or the like and including the features of this invention.

Therefore, by using a perforated wall portion 40 (Fig. 3) in the test section 42 of a wind tunnel duct 44 means of eliminating both the returning effect of Fig. 1 and the constant pressure boundary requirement of Fig. 2 are provided. By maintaining a proper pressure differential between the test section 42 and the plenum chamber 46 by use of suction pump 44, it is possible to obtain a flow condition such that neither a shock wave or an expansion field will be reflected from the wall 40 from an impinging shock wave 50 which emanates from the leading edge 52 of a body such as illustrated at 54.

Figure 4:
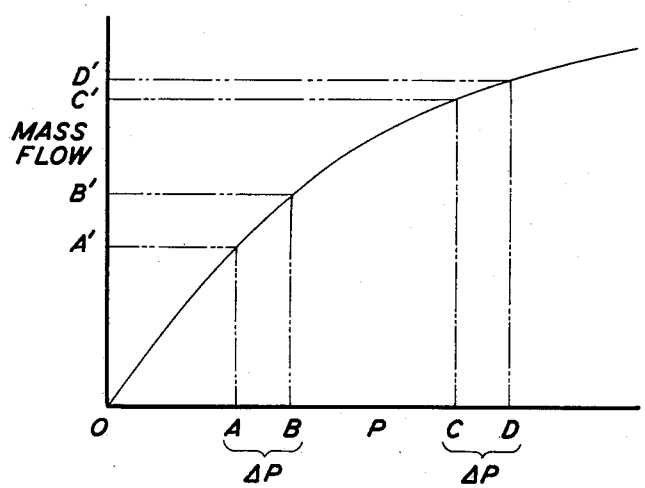
Fig. 4 is a diagrammatic illustration of a characteristic of fluid flow in a device such as illustrated in Fig. 3.

However, it can be shown that for a given pressure differential between the test section 42 and the chamber 46 varying amounts of weight flow must be removed through the perforations 60 of the wall 40 for a no reflection condition, dependent upon stream Mach number and stream deflection angle. Thus a wall giving varying amounts of flow for the same pressure differential is required. Fig. 4, which is a typical perforated wall calibration curve, illustrates how this is accomplished. By initially operating the wall at a slight convergence angle such that an increment of pressure drop OA exists across the perforated wall and there adding a further ΔP, (AB), an amount of mass flow A'B' will be induced through the wall by this addition of ΔP (AB). However, starting with an initially greater convergence angle of the wall such that an increment of pressure drop OC exists across the perforated wall and adding on a further ΔP, (CD), equal to AB, an amount of mass flow C'D' will be induced through the wall, C'D' being less than A'B'. Therefore, in order to obtain an effectively varying porosity wall, the perforated plate is hinged at 70 and provided with hydraulic actuating cylinders 72 or the like in order to supply the varying initial wall convergence. In order to obtain shock cancellation under varied stream conditions it is necessary to obtain a change in effective porosity. In other words, the effect of having walls of different porosity is obtained without actually changing the porosity. Thus it is possible to avoid the complication of constructing many walls of different porosity and obtain a variation in ebective porosity of a given wall.

With a device such as this, shock wave reflection either as a reflected shock wave or a reflected expansion field is eliminated over a range of supersonic main stream Mach numbers and stream deflection angles so that correct test data can be obtained for a given body such as 54 which may be located in the main stream.

Although only one embodiment of this invention has been illustrated and described herein, it will be apparent that various changes and modifications may be made in the construction and arrangement of the various parts without departing from the scope of this novel concept.

What it is desired to obtain by Letters Patent is:

1. In combination, a fluid control surface having a supersonic stream flowing thereover, a body spaced from said surface and located in the stream whereby a shock wave emanates therefrom, means for eliminating the reflection of the shock by said surface back to said body comprisin
surface, n
side of sa
the stream
tion, and
said perfc
stream en
tion about
face to va
pressure a 2. In c
supersonic
the surfac
wave ema
means for
surface ba
portion fc
said shoc
lower on
stream, a
of said w
flow throu
the angle
axis of s
movable
stream er